United States Patent [19]

Beswick

[11] Patent Number: 4,922,805
[45] Date of Patent: May 8, 1990

[54] FLUID ACTUATED CYLINDER

[76] Inventor: Paul R. Beswick, 128 Topsfield Rd., Ipswich, Mass. 01938

[21] Appl. No.: 244,137

[22] Filed: Sep. 14, 1988

[51] Int. Cl.<sup>5</sup> ............................................. F16J 15/18
[52] U.S. Cl. .................................. 92/166; 92/165 R; 92/117 R; 403/342
[58] Field of Search ....................... 92/13.41, 13.6, 59, 92/85 R, 128, 161, 146, 163, 165 R, 166, 167, 118, 51, 117 R, 169, 171; 403/13, 342 X

[56] References Cited

U.S. PATENT DOCUMENTS

| | | | |
|---|---|---|---|
| 2,946,316 | 7/1960 | Bruehl | 92/166 |
| 2,953,119 | 9/1960 | Geyer | 92/166 |
| 3,333,513 | 8/1967 | Wettstein | 92/169 |
| 3,559,540 | 2/1971 | Sheldon | 92/163 |
| 3,750,537 | 8/1973 | Goade et al. | 92/165 R |
| 3,777,627 | 12/1973 | Goade | 92/171 |
| 3,955,479 | 5/1976 | McLuckie | 92/171 |
| 4,185,549 | 1/1980 | York et al. | 92/171 |
| 4,447,194 | 5/1984 | Worby | 92/171 |

FOREIGN PATENT DOCUMENTS

| | | | |
|---|---|---|---|
| 2160407 | 6/1973 | Fed. Rep. of Germany | 92/167 |
| 2064671 | 6/1981 | United Kingdom | 92/166 |

Primary Examiner—Robert E. Garrett
Assistant Examiner—Thomas Denion
Attorney, Agent, or Firm—Owen J. Meegan

[57] ABSTRACT

A fluid actuated cylinder is provided having a piston and piston rod combination disposed in a tubular casing having a nose end and tail end. The piston is disposed on the piston rod spaced from both ends of the rod, the outer end extending through a bearing disposed at the nose end of the casing, and a unitary member which is employed to close the tail end of the casing is provided with a bearing for supporting the inner end of the piston rod.

11 Claims, 2 Drawing Sheets

FLUID ACTUATED CYLINDER

BACKGROUND OF THE INVENTION

The present invention relates to a fluid actuated cylinder and more particularly to a fluid actuated cylinder which is adaptable for use in a linkage system that may be subjected to a side loading in addition to a desired axial loading.

In the field of fluid cylinder construction, many devices exist which are employed to provide axial loading in a linkage arrangement through the use of liquid or hydraulic power, and many of the designs presently in use have been employed with success over a period of years. However, there exists a problem in the design of such devices which in some instances can lead to failure and may, in any event, lead to the shortening of the useable life of the device.

In most designs of this type, a single nose bearing is employed to support the piston rod at the nose end of the cylinder and the bearing length is rarely longer than twice, and usually less than one and a half times the diameter of the piston rod. This is largely due to the mounting and interchangability standards of the industry that more or less dictate the configuration of the mounting centers, diameters, lengths, shoulder positions, port sizes, etc. When a cylinder such as this is used in an application where the load or resisting forces are closely coaxial with the centerline of the piston rod assembly, the length to diameter ratio on the nose bearing is not of great importance to longevity, reliability, etc. In addition, a cylinder with a primarily axial load is usually mounted at the nose end and located in the linkage wherein side loads and reverse loading are not of importance, although situations may arise where users apply side loading and reverse loading to nose mounted cylinders of this type.

On the other hand, when a cylinder is employed as part of a rocking linkage for example, it is mounted by a pivot pin at the tail portion of the cylinder, a clevis is screwed onto the threaded end of the rod which in turn is freely pinned to a bell crank or link. With this type of linkage, there is a side load condition present at the nose bearing which is induced by the weight of the cylinder tending to cause the assembly to sag due to the spacing provided in the manufacturing clearance of the nose joint bearing. Thus this sag induces, for example, a side load on the nose bearing. Further, when the cylinder is actuated by the fluid entering a port, the resulting forces (including reaction forces) acting upon this sliding nose joint causes the rod to tilt in the opposite extreme as it translates through the bearing in the process of applying force to the driven load or in the process of retraction.

During operation, this loading induces a tilting effect of the rod through the nose bearing which takes place in the slight clearance provided in the manufacturing process and as the rod extends, the rocking effect of the applied load by the bell crank causes this tilting to reverse to the opposite extreme. In some applications the reversal is sudden, possibly creating shock loading. This reversal of loading on the nose bearing very rapidly induces wear at the inner and outer edges of the bearing bore and these repeated reversals of loading lead to accelerated wear and early malfunction and/or failure. Typically, the piston outer diameter which has a much greater clearance to the wall than is customary in the bearings, soon rubs or drags on the cylinder wall creating excessive forces which must be overcome and which create a generally unacceptable resistance to motion within the cylinder.

In conventional designs, the inner and outer edges of the nose bearing absorb the reaction force while simultaneously being subjected to highly concentrated loading. The present invention spreads this force couple substantially equally between the two separate bearings thereby to reduce the load concentrations substantially and thereby increase the life of the bearing surfaces as well.

Exemplary of the prior art are pistons disclosed in the following patents:

| Cole | 1,003,235 | Beckett | 3,180,236 |
| Jacobsen | 1,598,138 | Paul | 3,717,070 |
| Braren | 1,747,968 | Ides | 4,185,543 |
| Christensen | 2,410,808 | Wallischeck | 4,211,151 |
| Shepherd | 3,132,569 | Devaud | 4,414,881 |
| Renzi | 4,592,267 | Dirkin | 4,685,384 |

The present invention therefore has an object to provide a fluid actuated cylinder which retains its operating integrity and efficiency when incorporated into a linkage which is susceptible to side loading.

A further object of the invention is to provide a fluid actuated cylinder of the type described which retains its operating integrity and efficiency under side loading while staying substantially within the industry's standards of mountings, length, diameter, ports, etc.

Another object of the invention is to provide a fluid actuated cylinder which retains the convenience and feature of a pivot mounting hole in the tail sub-assembly while displaying a high degree of efficiency and integrity when employed in a linkage which may be susceptible to side loading.

Yet another object of the invention is to provide a fluid actuated cylinder of the type disclosed which can readily be employed to update, rebuild or repair, machinery presently in use, the cylinder having mounting characteristics which are substantially the same as products which were provided in the past.

Still a further object of the invention is to provide a fluid actuated cylinder which has a minimum number of components, all of which are readily accessible for repair or replacement, during the life of the cylinder.

SUMMARY OF THE INVENTION

The above objects, and other objects which will become apparent as the description proceeds, are achieved by providing a fluid activated cylinder comprising a cylinder wall structure in the form of a tubular casing having a nose end and a tail end, each having an opening formed therein. A piston and piston rod are disposed within the cylinder wall structure, the piston being disposed on the rod and spaced from the inner end of the rod. An end wall is disposed in an opening in the nose end of the casing, the wall having a bearing assembled therein through which the outer end of the piston rod extends, and a unitary member having a tang extending outwardly from the tail end opening of the casing and a surface disposed in engagement with the cylinder tail end wall structure is provided. The unitary member further comprises a barrel portion having one end extending into the cylinder and in spaced relation with the tubular casing. A cylindrical bore extends through the barrel portion and into the member to a point adjacent the tang, and a bearing is mounted in the end of the barrel for supporting the piston rod inner end during piston travel between the barrel end and the wall in the nose end of the casing. A pair of openings are formed in the cylinder, one at each end thereof for flow of fluid into and from the cylinder to move the piston and piston rod axially within the cylinder.

The unitary member may comprise a cylindrical portion disposed between the barrel portion and the tang, the cylindrical portion tang end terminating in a radially outwardly extending step forming an annular element having a surface for mating engagement with the tail end surface of the casing with the cylindrical portion extending into close fitting relation with the casing wall. A closure ring is provided extending over the tubular casing having threads formed on the internal surface thereof and an internally extending shoulder having a surface thereof facing axially toward the threads. A plurality of mating threads are formed on the external surface of the tubular casing tail end adjacent the tail end opening. An externally outwardly facing surface is provided on the annular member whereby when the closure ring is in tightened threaded engagement with the tubular casing, the shoulder surface of the closure ring is forced into engagement with the outwardly facing annular member surface to retain the annular member engaged between the closure ring and the casing end surface.

The tail end of the casing structure may be provided with an axial slotted opening formed therein and the unitary member may be provided with a radially outwardly extending member disposed on the unitary member outer surface for interfitting engagement with the slotted opening when the unitary member surface is engaged with the tail end wall structure to thereby inhibit rotation of the unitary member relative to the casing during operation of the cylinder.

BRIEF DESCRIPTION OF THE DRAWING

The foregoing and other features of the invention will be more particularly described in connection with the preferred embodiment, and with reference to the accompanying drawing, wherein.

DESCRIPTION OF THE PREFERRED EMBODIMENT

Figure 1:
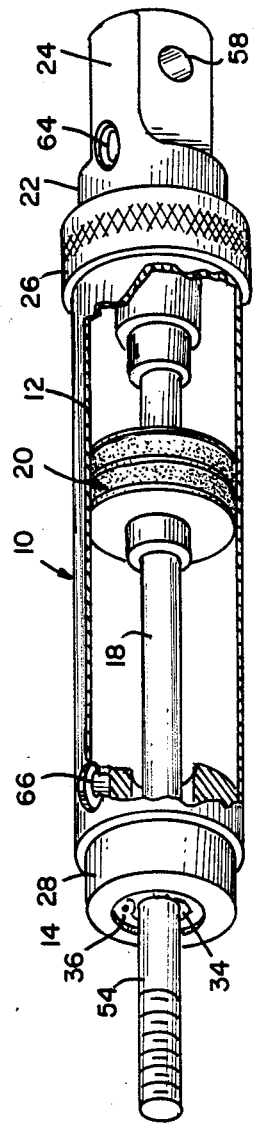
FIG. 1 is an elevational perspective view, partially in section showing a fluid actuated cylinder constructed in accordance with the teachings of the present invention.
Figure 2:
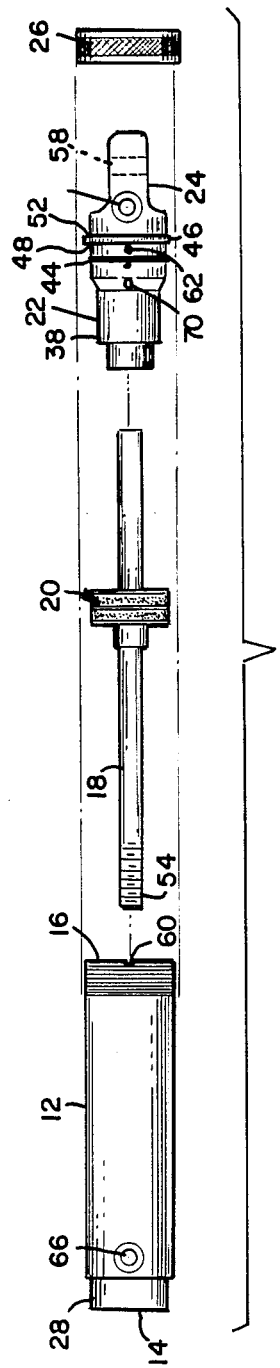
FIG. 2 is an elevational exploded view showing details of the elements forming the fluid actuated cylinder of FIG. 1.

Referring now to the drawing and in particular to FIGS. 1 and 2, there is shown a fluid actuated cylinder 10 (which can be of the double action type) that has been constructed in accordance with the teachings of the present invention. The cylinder 10 comprises cylinder wall structure in the form of a tubular casing 12 having an opening 14 at the nose end of the casing, and an opening 16 at the tail end of the casing. A piston rod 18 has a piston 20 affixed thereto which is spaced from the tail end and nose end of the piston rod 18. Piston 20 is preferably formed of a pair of U-shaped rings 20a disposed in channels formed of end members 20b and separated by a center member 20c. End members 20b and center member 20c have diameters slightly smaller then the interior of casing 12 and rings 20a are slightly larger whereby they will rub against the interior of casing 12 to form a seal.

A unitary member 22 having a tang 24 extending outwardly from the tail end of the casing 12 is employed to seal the opening 16 of the casing, and a closure ring 26 is employed to maintain the member 22 in forced engagement with the casing 12.

Figure 3:
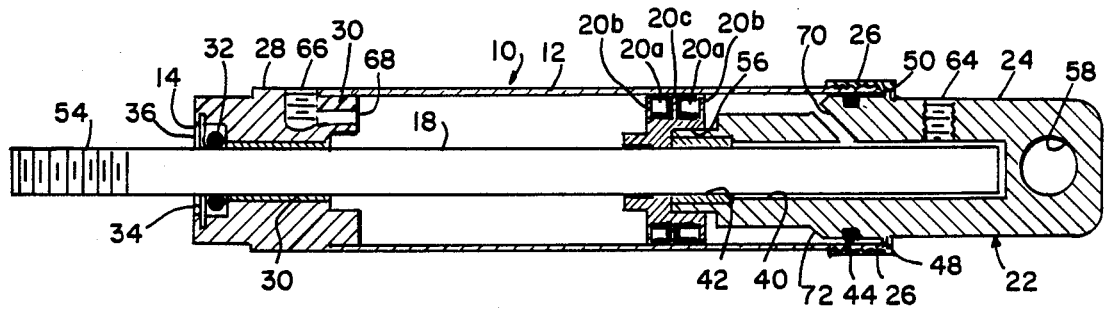
FIG. 3 is an elevational sectional view taken along the longitudinal centerline of the fluid actuated cylinder of FIG. 1 showing further details of the structure.

Referring to FIG. 3 taken in conjunction with FIGS. 1 and 2, the basic elements set forth above are shown to be assembled with the piston 20 in the fully retracted position. A nose bearing support 28 is affixed to the nose end of the casing 12 and has a nose bearing 30 pressed into an internal bore in the support, through which the piston rod 18 extends. A generally U-shaped pressure seal 32 is mounted in the support 28 and a washer 34 serves as a seal retainer when assembled in close fitting engagement with the seal 32. A snap ring 36 fits into an annular groove provided in the nose bearing support 28 to retain the washer 34 and seal 32 in place.

Referring again to FIG. 3 taken in conjunction with FIGS. 1 and 2, the unitary member 22 is shown to be assembled into the opening 16 with the tang 24 extending rearwardly outwardly from the casing 12 and a barrel portion 38 projecting into the interior of the casing. The barrel portion 38 is provided with a cylindrical bore 40 extending through the barrel portion and into the member 22 to a point adjacent the tang 24. A bearing 42 is mounted in the cylindrical bore 40 at the inner end of the barrel portion 38 and serves to support the piston rod 18 during piston travel between the barrel portion inner end and the inner end wall of the nose bearing support 28.

Referring particularly to FIG. 2 and FIG. 3, it will be noted that the member 22 is provided with an O ring 44 which serves to provide a seal between the inner wall of the casing 12 and the external wall of the member 22. This cylindrical portion of the member 22 which contains the O ring 44 is provided with a radially outwardly extending step which forms an annular element 46 having a surface 48 for mating engagement with the tail end surface of the casing 12. The closure ring 26 extends over the tubular casing 12 and has threads formed on its internal surface and a radially extending shoulder 50 surface which faces axially toward the threads. A plurality of mating threads are formed on the external surface of the casing 12 tail end wall structure and an outwardly facing radial surface 52 on the annular member contacts the surface 50 of the ring 26 when the threads are engaged the shoulder surface 50 of the ring 26 is forced into engagement with the annular member surface 52 to enclose the annular member 46 between the ring 26 and the casing 12.

Figure 3A:
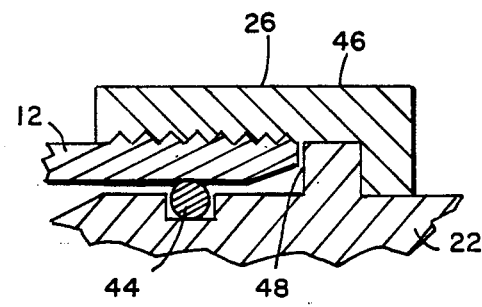
FIG. 3a is a fragmentary sectional view taken on an enlarged scale for clarity and showing a portion of the structure of FIG. 3.

As shown in FIG. 3a, threads in the ring 26 engage threads in the casing 12. An inwardly disposed shoulder on the ring 26 engages a flange 48 when the ring 26 is firmly closed. The ring 44 disposed in a groove in the member 22. As shown, the end of the casing beneath the threads is tapered, generally at an angle of about 20° for ease of insertion of the member 22, self-alignment, and protection of the ring 44 from damage.

The piston rod 18 is provided with threads 54 at the nose end thereof for attachment to a clevis or other linking device, and the tail end of the rod extends rearwardly into the bore 40 of the member 22. The piston 20 has an annular step 56 provided in the piston adjacent the piston rod 18 in facing relation with the barrel portion 38 to receive the end of the barrel portion and allow the piston to travel past the end of the barrel portion during its movement towards the tail end of the casing 12.

The cylinder 10 is generally incorporated into a hydraulic system by attachment of the piston rod 18 to operative structure employing the threads 54 provided at the outer or nose end of the piston rod. The tail end of the cylinder 10 is attached by means of a cylindrical opening 58 formed in the tang 24.

In order to maintain alignment of the cylinder relative to the attachment at the tang 24, an axial slotted opening 60 is formed in the casing 12 and a radially outwardly extending pin 62 is disposed on the outer surface of the unitary member 22. With the unitary member 22 in the assembled condition as shown in FIG. 3, the pin 62 extends radially outwardly through the slotted opening 60 enabling self alignment upon assembly and preventing rotational movement of the member 22 relative to the casing 12.

To operate the cylinder 10, a suitable fluid, which may be a liquid or gas, is conducted to either end of the cylinder and enters through a port 64 formed in the member 22, or through a port 66 formed in the nose bearing support 28. A second conduit 68 communicates between the port 66 and the interior of the casing 12, and a secondary conduit 70 provides for flow of fluid between the bore 40, into which the port 64 is directed, and the interior of the casing 12. The piston rod 18 is thus moved from its forward extended position to its most rearward extended position as shown in FIG. 3 through pressurization either at the port 66 or the port 64. Travel of the piston rod 18 is supported at all positions by the bearing 30 and the bearing 42 which are preferably of the "no lube" type.

As indicated above, the bearings 30 and 42 as well as the seals in the cylinder 10 require no lubrication. Typically, these materials are graphite, molybdenum disulfide, or granulated Teflon imbedded into a buna or nitrile rubber or into any of the known versions of Nylon or Delrin (each of the trademarked marked materials are tradenames of Dupont de ne Mours Corp. of Delaware). For the bearings, porous sintered bronze impregnated with oil that slowly migrates to the surface as the bearing is used. The bearings and the seals are thus made of selected materials that include traces of solid film type lubrication that slowly deposit and/or migrate to the sliding surfaces as the cylinder is used. In addition, the moisture present in compressed air employed in a cylinder of this type, and of course the lubrication properties which are inherent in hydraulic fluids which may be employed, substantially contribute to the lubrication of the cylinder bearings 30 and 42 as well as to the piston 20 as it is cycled during the life of the cylinder.

Additionally, it should be observed that in the present structure, the replacement of worn parts is easily accomplished by merely removing the closure ring 26 after which the member 22 is removed providing access to removal of the piston rod 18 and piston 20 through the tail end of the casing 12. When assembling the unitary member into the opening 16, a tapered surface 72 facilitates insertion of the member into the casing 12 through the opening 16. The seal 32 and bearing 30 are also easily accessible by removal of the snap ring 36 and washer 34 at the nose end of the cylinder 10.

From the foregoing, it should be appreciated that the cylinder 10 of the present invention has incorporated a bearing at the tail end of the cylinder for supporting the piston rod 18 while allowing the design to stay substantially within the industry's standards of mounting, length, diameters, ports, etc. The cylinder 10 also retains the convenience of pivot mounting at the tail end of the cylinder by providing the unitary member 22 having a tang 24 with the opening 58. The cylinder therefore can be sufficiently implemented into a user's designs and can be employed as an extendable link in a mechanism which is in existence thereby saving considerable space and cost. By providing the compact design of the present construction, mounting characteristics may be retained substantially as in products which have been manufactured without a rear bearing, allowing the present invention to be employed to repair machinery or to update linkages which are in use. Further, by providing the unitary member 22 having a surface at the shoulder 48 retained in clamping engagement with the casing 12, loading of the bearing 42 is substantially eliminated in the structure at the clamped annular element 46 providing a rigid structure and lessening any possible loading at the piston 20.

Although it is apparent that changes and modifications may be made within the spirit and scope of present invention, it is my intention only to be limited by the appended claims.

As my invention, I claim:

1. A fluid actuated cylinder comprising:
   a cylinder wall structure in the form of a tubular casing having a nose end and a tail end, each having an opening formed therein;
   a piston and piston rod disposed within said cylinder wall structure, said piston being disposed on said rod and spaced from the inner end of said rod;
   an end wall disposed in the nose end opening of said casing wall having a bearing assembled therein through which the outer end of said piston rod extends;
   a unitary member having a tang extending outwardly from the tail end opening of said casing and a surface disposed in engagement with said cylinder tail end wall structure, said member further comprising a barrel portion having one end extending into said cylinder and in spaced relation with said tubular casing;
   a cylinder bore extending through said barrel portion and into said member to a point adjacent said tang;
   a bearing mounted in said one end of said barrel portion for supporting said piston rod inner end during piston travel between said tail end and said end wall;
   a pair of openings formed in said cylinder, one at each end thereof for flow of fluid into and from said cylinder to move said piston and rod therein, one of said openings being formed in said unitary member and comprising a pair of passages, one passage communicating with said bore at a location spaced from said barrel bearing and the other passage extending from said bore into said casing interior between said unitary barrel member portion and said casing interior wall structure.

2. A fluid actuated cylinder as set forth in claim 1 wherein said unitary member comprises a cylindrical portion disposed between said barrel portion and said tang, said cylindrical portion having an O ring seal disposed thereon and being disposed within said casing in close fitting relation with said casing inner wall.

3. A fluid actuated cylinder as set forth in claim 1 wherein said unitary member comprises a cylindrical portion disposed between said barrel portion and said tang, said cylindrical portion tang end terminating in a radially outwardly extending step having a surface for mating engagement with the tail end surface of said casing, with said cylindrical portion extending into close fitting relation with said casing inner wall.

4. A fluid actuated cylinder as set forth in claim 1 wherein said unitary member comprises a cylindrical portion disposed between said barrel portion and said tang, said cylindrical portion tang end terminating in radially outwardly extending step forming an annular element having a surface for mating engagement with the tail end surface of said casing with said cylindrical portion extending into close fitting relation with said casing wall, a closure ring extending over said tubular casing having threads formed on the internal surface thereof and an internally extending shoulder having a surface at one end thereof facing axially toward said threads;

a plurality of mating threads formed on the external surface of said tubular casing tail end wall structure; and an outwardly facing surface on said annular element whereby with said closure ring in a tightened threaded engagement with said tubular casing, said shoulder surface of said closure ring is forced into engagement with said outwardly facing annular element surface to retain said annular element engaged between said closure ring and said casing end surface.

5. A fluid actuated cylinder as set forth in claim 1 wherein said piston has an annular step provided therein adjacent said piston rod and in facing relation with said barrel portion end and dimensioned to receive said end of said barrel portion to allow said piston to travel past said end of said barrel portion.

6. A fluid actuated cylinder as set forth in claim 3 wherein said tail end of said casing has an axial slotted opening formed therein and said unitary member has a radially outwardly extending member disposed on said unitary member outer surface for interfitting engagement in said slotted opening when said unitary member surface is engaged with said tail end wall structure, to thereby inhibit rotation of said unitary member relative to said casing.

7. A fluid actuated cylinder as set forth in claim 2 wherein said cylindrical portion tang end terminates in a radially outwardly extending step having a surface for mating engagement with the tail end surface of said casing, with said cylindrical portion extending into close fitting relation with said casing inner wall.

8. A fluid actuated cylinder as set forth in claim 7 wherein said cylindrical portion tang end terminates in a radially outwardly extending step forming an annular element having a surface for mating engagement with the tail end surface of said casing with said cylindrical portion extending into close fitting relation with said casing wall;

a closure ring extending over said tubular casing having threads formed on the internal surface thereof and an internally extending shoulder having a surface at one end thereof facing axially toward said threads, a plurality of mating threads formed on the external surface of said tubular casing tail end wall structure, and an outwardly facing surface on said annular element whereby with said closure ring in tightened threaded engagement with said tubular casing, said shoulder surface of said closure ring is forced into engagement with said outwardly facing annular member surface to retain said annular member engaged between said closure ring and said casing end surface.

9. A fluid actuated cylinder as set forth in claim 8 wherein said tail end of said casing has an axial slotted opening formed therein and said unitary member has a radially outwardly extending member disposed on said unitary member outer surface for interfitting engagement in said slotted opening when said unitary member surface is engaged with said tail end wall structure to thereby inhibit rotation of said unitary member relative to said casing.

10. A fluid actuated cylinder as set forth in claim 9 wherein one of said openings is formed in said unitary member and comprises a pair of passages, one passage communicating with said bore at a location spaced from said barrel bearing and the other passage extending from said bore into said casing interior between of said unitary member barrel portion and said casing wall structure.

11. A fluid actuated cylinder as set forth in claim 10 wherein said piston has an annular step provided therein adjacent said piston rod and in facing relation with said barrel portion end and dimensioned to receive said end of said barrel portion to allow said piston to travel past said end of said barrel portion.

* * * * *